United States Patent [19]
Saeki et al.

[11] Patent Number: 5,581,787
[45] Date of Patent: Dec. 3, 1996

[54] PROCESSING SYSTEM AND METHOD FOR ALLOCATING ADDRESS SPACE AMONG ADAPTERS USING SLOT ID AND ADDRESS INFORMATION UNIQUE TO THE ADAPTER'S GROUP

[75] Inventors: Yuuji Saeki; Shiro Ohishi, both of Hadano, Japan

[73] Assignee: Hitachi, Ltd., Tokyo, Japan

[21] Appl. No.: 266,863

[22] Filed: Jul. 5, 1994

Related U.S. Application Data

[63] Continuation of Ser. No. 436,796, Nov. 15, 1989, abandoned.

[30] Foreign Application Priority Data

Nov. 15, 1988 [JP] Japan .................. 63-288336

[51] Int. Cl.⁶ .................. G06F 12/02; G06F 12/06; G06F 13/20
[52] U.S. Cl. .................. 395/829; 364/DIG. 1; 364/254; 364/254.3; 364/DIG. 2; 364/957; 364/957.2
[58] Field of Search .................. 395/829

[56] References Cited

U.S. PATENT DOCUMENTS

| | | | |
|---|---|---|---|
| 4,368,514 | 1/1983 | Persoud et al. | 364/200 |
| 4,413,319 | 11/1983 | Schultz et al. | 364/200 |
| 4,556,953 | 12/1985 | Caprio et al. | 364/900 |
| 4,593,352 | 6/1986 | Castel et al. | 364/200 |
| 4,905,182 | 2/1990 | Fitch et al. | 364/400 |
| 4,931,923 | 6/1990 | Fitch et al. | 364/200 |
| 4,964,038 | 10/1990 | Louis et al. | 364/200 |
| 4,992,976 | 2/1991 | Yonekura et al. | 395/275 |
| 4,993,019 | 2/1991 | Cole et al. | 370/67 |
| 5,038,320 | 8/1991 | Herth et al. | 395/275 |

FOREIGN PATENT DOCUMENTS

| | | |
|---|---|---|
| 0044949 | 2/1982 | European Pat. Off. . |
| 0187453 | 7/1986 | European Pat. Off. . |
| 2932868 | 3/1980 | Germany . |
| 3347357 | 7/1985 | Germany . |
| 61-220054 | 9/1986 | Japan . |

OTHER PUBLICATIONS

Budrinski, "Geographic Addressing with Multibus II", System Design, *New Electronics*, 1986 pp. 27–28.
N. D. Mackintosh "Interrogation tells µP which boards are present", µC Design Techniques, v. 6 Feb. 1981.

*Primary Examiner*—Thomas C. Lee
*Assistant Examiner*—D. Dinh
*Attorney, Agent, or Firm*—Antonelli, Terry, Stout & Kraus

[57] ABSTRACT

An information processing system is disclosed which includes an information processing apparatus having a plurality of slots on which a plurality of types of adapters can be mounted. Each type of the adapters has not its own address allocated by the system but will have, when mounted on any one of the slots, an address defined by the slot on which the adapter is actually mounted. In determining the system configuration, a processor accesses the addresses allocated to the slots sequentially and will receive adapter ID's from the adapters mounted on the slots.

5 Claims, 2 Drawing Sheets

FIG. 3

| ADAPTER | ADAPTER ID(HEX) |
|---|---|
| ADAPTER A | 00H |
| ADAPTER B | 01H |
| ADAPTER C | 02H |
| ADAPTER D | 03H |
|  |  |
|  |  |
| ADAPTER Y | 18H |
| ADAPTER Z | 19H |

FIG. 4

| SLOT # | a | b | ALLOCATED ADDRESSES |
|---|---|---|---|
| SLOT #0 | L | L | F000H~F3FFH |
| SLOT #1 | L | H | F400H~F7FFH |
| SLOT #2 | H | L | F800H~FBFFH |
| SLOT #3 | H | H | FC00H~FFFFH |

FIG. 5

| SLOT # | a | b | ALLOCATOR OUTPUTS |
|---|---|---|---|
| SLOT #0 | L | L | (1 1 1 1 0 0)B |
| SLOT #1 | L | H | (1 1 1 1 0 1)B |
| SLOT #2 | H | L | (1 1 1 1 1 0)B |
| SLOT #3 | H | H | (1 1 1 1 1 1)B |

FIG. 6

| SLOT # | ADAPTER ID | ADDRESS ALLOCATOR OUTPUTS |
|---|---|---|
| SLOT #0 | 02H | (1 1 1 1 0 0)B |
| SLOT #1 | 19H | (1 1 1 1 0 1)B |
| SLOT #2 | FFH | — |
| SLOT #3 | 02H | (1 1 1 1 1 1)B |

FIG. 7

| SLOT # | a | b | ALLOCATOR #1 | ALLOCATOR #2 | ALLOCATOR #3 |
|---|---|---|---|---|---|
| SLOT #0 | L | L | (1 1 1 1 0 0)B | (1 1 0 1 0 0)B | (1 1 1 0 0 0)B |
| SLOT #1 | L | H | (1 1 1 1 0 1)B | (1 1 0 1 0 1)B | (1 1 1 0 0 1)B |
| SLOT #2 | H | L | (1 1 1 1 1 0)B | (1 1 0 1 1 0)B | (1 1 1 0 1 0)B |
| SLOT #3 | H | H | (1 1 1 1 1 1)B | (1 1 0 1 1 1)B | (1 1 1 0 1 1)B |

PROCESSING SYSTEM AND METHOD FOR ALLOCATING ADDRESS SPACE AMONG ADAPTERS USING SLOT ID AND ADDRESS INFORMATION UNIQUE TO THE ADAPTER'S GROUP

This application is a continuation of application Ser. No. 436,796 filed on Nov. 15, 1989 now abandoned.

BACKGROUND OF THE INVENTION

This invention relates to an information processing system, and more particularly to a system including an information processing apparatus having a plurality of slots, e.g. connectors or sockets onto which respective ones of a plurality of types of adapters can be mounted.

Information processing systems such as computer terminals or the like, are provided with a number of adapters, which support general purpose interfaces in order to meet a variety of user's requests. Usually each type of the adapters has a unique address area allocated thereto by the system. Also, upon user's requests any one of the adapters is mountable on any desired one of the slots.

In such a system allowing any type of the adapter to be mounted on any slot, it is necessary to set control data for controlling priority of interrupt requests, direct memory access, or the like depending on the system configuration i.e. the types and combination of the mounted adapters. One approach to this requirement is taught in Japanese laid-open patent No. 61-220054. In this disclosure a unique number is physically assigned to each of the slots and a unique address area is allocated to each of the types of adapters. In determining the system configuration addresses of all types of adapters are sequentially accessed by a processor. If the adapter accessed by the processor is mounted on any one of the slots, the adapter will return the number assigned to the slot to the processor. Thus, the processor knows what type of adapter is actually mounted on which slot thereby automatically setting the priority control data or the like.

A high-speed, high-performance and multi-functional computer terminal, such as an engineering workstation, which has appeared in recent years, allows many types of external devices to be connected thereto. The external devices include printers, external hard disc drives, external floppy disc drives, modems, card readers, light pens, etc. These external devices are connected to the workstation typically via general purpose interfaces such as RS-232C, GPIB, SCSI or the like.

In order to connect to a large number of such external devices, the workstation requires a number of adapters mountable thereon which support the general purpose interfaces.

It is, however, difficult to mount two or more of the same type of adapters at the same time since the prior art approach assigns a unique address area to each type of the adapters to determine the system configuration. Although this may be overcome by giving different addresses to the same type of adapters, it will result in a virtual increase of the types of adapters, leading to a running short of the address space available to allocate to the adapters. Also, it becomes complex to manage the adapters because of the various combinations thereof.

Moreover, the prior art approach to determine the system configuration requires a number of times of accessing addresses since the accesses are sequentially done to the addresses allocated to all types of adapters to determine the identity of the mounted adapters.

SUMMARY OF THE INVENTION

Accordingly, it is an object of the present invention to provide an information processing system and method for determining the configuration thereof which will allow two or more of the same type of adapters to be mounted on the slots at the same time.

It is another object of the present invention to provide an information processing system and method for determining the configuration thereof which can avoid running short of address space regardless of an increase of the types of adapters being used.

It is a further object of the present invention to provide an information processing system and method for determining the configuration thereof which facilitates determination of the configuration of the system with adapters mounted on the slots thereof.

According to the present invention, there is provided an information processing system comprising an information processing apparatus having a plurality of slots therein and a plurality of types of adapters which can be mounted on the slots of said information processing apparatus. The information processing apparatus includes means for generating slot ID signals each of which is unique for each of said slots. Each of said plurality of adapters includes means responsive to the slot ID signal for generating addresses to be allocated to the adapter, means for generating an adapter ID signal of the adapter, and means responsive to a request from said information processing apparatus for returning the adapter ID signal thereto. The means for generating addresses may be formed by any conventional means, such as a combinational logic circuit, a non-volatile memory (ROM), fixed potentials, etc.

In this system, said plurality of adapters may be divided into a plurality of groups, each of the groups being assigned a unique adapter ID and different groups of adapters may have different address allocators therein which generate different addresses even on an identical slot.

In another aspect of the present invention, the information processing system comprises an information processing apparatus having a plurality of slots and a plurality of types of adapters which can be mounted on the slots of said information processing apparatus, the information processing apparatus including means for generating addresses to be allocated to said adapters, each of the addresses being unique for each of said slots. Each of said plurality of adapters includes means for receiving an address to be allocated thereto from the slot on which the adapter is mounted, means for generating an adapter ID signal of the adapter, and means responsive to a request from said information processing apparatus for returning the adapter ID signal thereto.

The addresses from means for generating addresses may correspond to a part or high order bits of the address received from the information processing apparatus.

In yet another aspect of the present invention, an information processing apparatus is provided having a plurality of slots on which a plurality of types of adapters are mountable, the information processing apparatus comprising means for generating slot ID signals for identifying each of said slots, means for applying the slot ID signal to the adapter which is mounted on the slot, and means for sequentially accessing addresses allocated to the slots to thereby receive adapter ID signals of the adapters which are mounted on the slots.

The means for generating slot ID signals may, for example, comprise high and low potential levels uniquely combined for each of the slots.

Further, there is provided an adapter to be mounted on any one of a plurality of slots which are provided in an information processing apparatus, the adapter comprising means for receiving a slot ID signal from the slot on which the adapter is mounted, means responsive to the received slot ID signal for generating an address to be allocated to the adapter, means for generating an adapter ID signal which identifies the adapter and means responsive to a request from the information processing apparatus for outputting said adapter ID signal.

The present invention also provides another adapter to be mounted on any one of a plurality of slots which are provided in an information processing apparatus, the adapter comprising connection means for receiving from any one of the slots a slot ID signal which identifies the slot, address allocator means for generating an address to be allocated to the adapter in accordance with the slot ID signal, comparator means for comparing the output address from the address allocator means with a part of the address applied from said information processing apparatus, decoder means for decoding, when enabled by the output of said comparator, another part of the address from said information processing apparatus, means for generating an adapter ID signal which identifies the adapter, and control means for outputting the adapter ID signal to said information processing apparatus and for performing the functions of the adapter.

The present invention further provides a method for determining the configuration of an information processing system which includes an information processing apparatus having a plurality of slots on which a plurality of types of adapters are mountable, the method comprising the steps of: allocating a unique address on the system to each of the slots; assigning an adapter ID to each type of the adapters; causing said information processing apparatus to sequentially access addresses allocated to the slots; and causing each of said adapters to return the adapter ID to said information processing apparatus.

More specifically, a method is provided for allocating addresses to adapters mounted on the slots which are provided in an information processing apparatus, the method comprising the steps of: allocating a unique address area to each of the slots; and then assigning, if an adapter is mounted on any one of the slots, the address area allocated to the slot on which the adapter is mounted.

In accordance with the present invention, an address to be allocated to an adapter is defined not depending on the type of the adapter but depending on the slot on which the adapter is now mounted. Although this makes it impossible to allocate unique addresses to all types of adapters, there is no problem because the maximum number of the adapters mountable on one information processing apparatus at the same time is limited to the number of the slots thereof from the beginning. In addition, since each of the slots has a different address to be allocated to an adapter, each adapter mounted on the slots has a separate address allocated even if two or more of the adapters are of the same type.

Also, for the same reason, if the number of the types of adapters increases through introducing newly designed ones, the system will not run short of address space to allocate an address area to the newly added types of adapters.

In addition, allocation of addresses to the slots makes it possible for the information processing apparatus to identify a slot by addresses for accessing. In order to determine what types of adapters are mounted on the slots and which slot each of the adapters is mounted on, sequential accesses are done to the addresses which are allocated to the slots. If any adapter is mounted on the accessed slot, the adapter will respond with an adapter ID data or signal representative of its own type of adapter. Thus, it is possible to know the type of adapter which is mounted on the accessed slot. No response within a predetermined period of time shows that no adapter is mounted on the accessed slot.

While, in the prior art method for determining the system configuration, adapter addresses are sequentially accessed to know on which slot the accessed adapter is mounted, in accordance with the present invention slot addresses are sequentially accessed to know what type of adapter is mounted on the accessed slot. Usually, the number of slots is substantially smaller than that of the types of adapters. Accordingly, the prior art approach needs a large number of accesses most of which will result in no response. In contrast, the approach of the present invention needs less access time with much less probability of no response, thus facilitating the process for determining the system configuration and reducing the processing time.

BRIEF DESCRIPTION OF THE DRAWING

FIG. 3 illustrates the types of the adapters which are employed in the system of the FIG. 2;

FIG. 4 illustrates the addresses assigned to the slots for the system shown in FIG. 2;

FIG. 5 illustrates the outputs of the address allocator shown in FIG. 1;

FIG. 6 illustrates the information of the system configuration which is determined and registered in the system; and FIG. 7 illustrates an alternative arrangement of the address allocator shown in FIG. 1.

PREFERRED EMBODIMENT OF THE INVENTION

Figure 2:
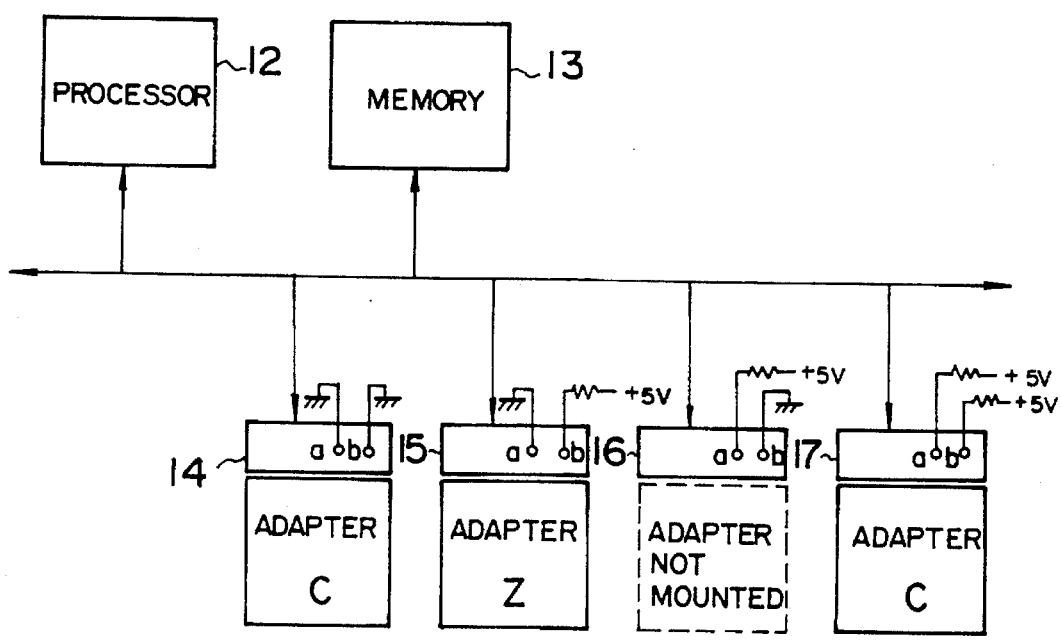
FIG. 2 is a block diagram of an information processing system according to the present invention.

Referring to FIG. 2, an information processing system comprises an information processing apparatus and adapters mounted thereon, which adapters are selectable from the adapters A–Z (shown in FIG. 3) supported by the system. The information processing apparatus includes a processor 12, memory 13 and four slots 14–17 on which any adapter is mountable. The processor 12, memory 13 and the slots 14–17 are interconnected via a bus. Two or more adapters of the same type are allowed to be mounted on the slots at the same time. In this example, two adapters of type C are mounted on slots 14 and 17 respectively and one adapter of type Z is mounted on slot 15. Each of the slots 14–17 has terminals a, b which are provided for electrical interconnection with an adapter. Each terminal is coupled to either high or low potential levels which are accomplished by connecting the terminal to +5 volts via a resistor or grounding the terminal in this example shown in FIG. 2. The combination of the two potential levels produces four unique and distinguishable numbers #0–#3 which are assigned to the slots 14–17 respectively. The combination of the two potential levels is used as a slot ID signal. While each of the four slots requires two terminals in this example, more terminals are necessary for more slots.

Figure 1:
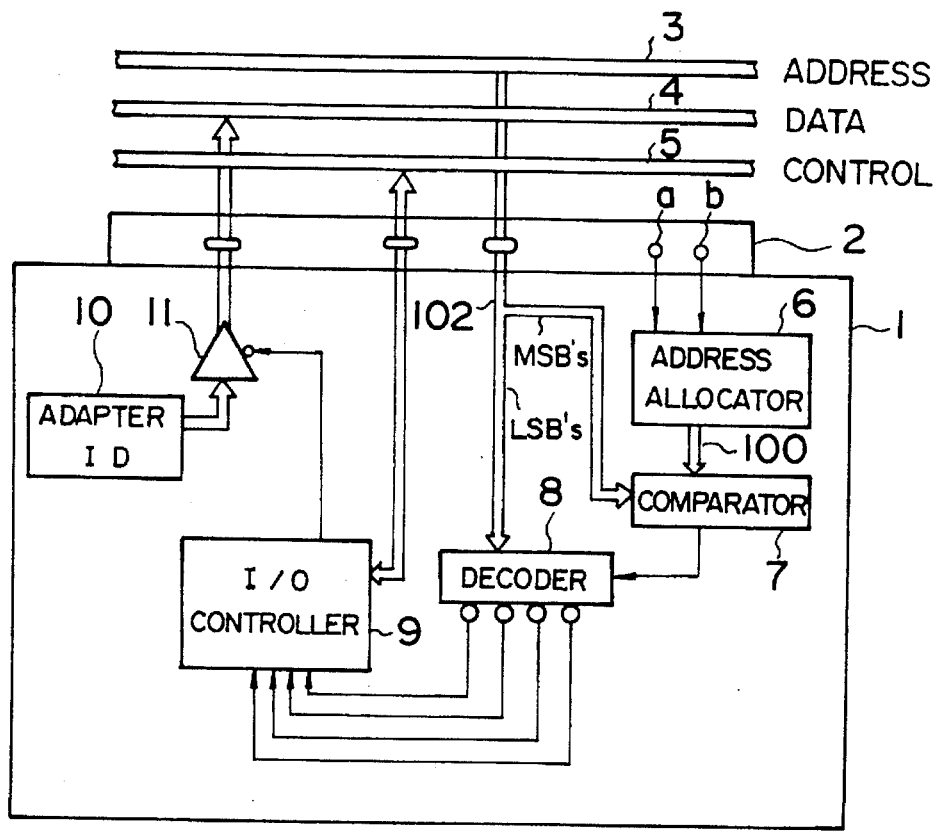
FIG. 1 shows an adapter in relation to the information processing apparatus according to the present invention.

Referring to FIG. 1 there is shown a card or adapter 1 mounted on a slot 2 (corresponding to any of the slots 14–17 in FIG. 2).

Adapter 1 is connected via the slot 2 to address, data and control buses 3, 4, and 5 of the information processing apparatus. The adapter 1 comprises address allocator 6, comparator 7, decoder 8, I/O controller 9, adapter I/D generator 10, output gate 11 and blocks (not shown) necessary for accomplishing the functions of the adapter 1. The address allocator 6 generates allocation address data 100 in response to the slot ID signal of the slot on which the adapter 1 is mounted. The comparator 7 compares the output 100 from the address allocator 6 with a part (high order bits) of address 102 from the address bus. The decoder 8 decodes the other part (low order bits) of the address 102 while being enabled by the output of the comparator 7 representing the coincidence of the two addresses. The I/O controller 9 is designed to control the adapter 1 according to the decoder output so as to accomplish the functions of the adapter 1. The adapter ID generator 10 generates a code or adapter ID which represents the type of the adapter 1. The output gate 11 puts the adapter ID onto the data bus 4 in response to the enable signal from the I/O controller 9.

Each of the slots #0–#3 has a unique address or address area allocated by the system as shown in FIG. 4. The digits with letter 'H' represents a hexadecimal number in the figures. The address area allocated to each of the slots is, as shown in FIG. 5, distinguished by the high order bits ($2^{15}$–$2^{10}$) of address 102. By providing the address allocator 6 within each of the adapters it is possible to produce the address data 100 which is defined depending on the combination of the potential levels of terminals a and b of the slot. The address allocator 6 may be of any type of circuit such as a combinational logic circuit, ROM table or the like which produces a predetermined output in response to a predetermined input. In the example of FIG. 5, since the two least significant bits of the allocator output happen to be the same as the two bits from the terminals a and b the two terminal bits can be used as two least significant bits for the allocator output and the remaining four higher bits for the allocator output may be produced by pulling the bits up to a fixed high potential level. This allocator output or address data 100 is applied to one input of the comparator 7.

On the other hand, six high order bits of the address 102 on the address bus 3 which is introduced through slot 2 into adapter 1 are applied to the other input of the comparator 7 to be compared with the address data 100 from the address allocator 6. The remaining ten lower bits of the address 102 are applied to decoder 8.

The comparator 7 compares its one input address with the other and enables the decoder 8 if the two addresses are equal to each other. When enabled, the decoder 8 decodes the ten bits from the address bus 3 to produce a decoded signal on one of the output lines representing the decoded input value. While disabled, the decoder 8 produces no output on any output line.

The output of decoder 8 is applied to the I/O controller 9 together with control signals, e.g. a read strobe, write strobe, etc., from the control bus 5. I/O controller 9 is adapted to control the original functions of the adapter and also, if requested by the information processing apparatus, enables the output gate 11 to put its adapter ID onto the data bus 4.

In the system configuration of FIG. 2, since one adapter C is mounted on the slot 14 the terminals a and b of which are both grounded, the address allocator 6 of the adapter C produces address data (111100)B as known from FIG. 5 and applies it to comparator 7. Similarly, adapter Z mounted on the slot 15 produces address data (111101)B at its address allocator 6 and another adapter C on the slot 17 produces address data (111111)B at its address allocator 6. The letter 'B' represents binary digits.

Now assuming that processor 12 places on the address bus 3 an address within an area F000H–F3FFH to access the adapter C on the slot 14, the comparator 7 of the adapter C on the slot 14 detects the coincidence of two addresses, causing the decoder 8 to be enabled. As a result, the adapter C performs a function associated with the decoder output. If the instruction from the processor 12 is a request for the adapter ID, I/O controller 9 of the adapter C enables the output gate 11 to put on the data bus 4 its adapter ID '02H' (See FIG. 3) in response to the output from the decoder 8.

On the other hand, adapters Z and C mounted respectively on the slots 15 and 17 detect discord of the addresses at their comparators 7, causing their decoders 8 to be disabled and resulting in no operation in the adapters Z and C on the slots 15 and 17.

By repeating the foregoing procedures sequentially to the addresses allocated to all slots, the actual system configuration is determined wherein adapter C (adapter ID '02H') is mounted on the slot #0, adapter Z (adapter ID '19H') is mounted on the slot #1 and another adapter C (adapter ID '02H') is mounted on the slot #3.

The information of the system configuration thus obtained is registered in the information processing apparatus as shown in FIG. 6. Specifically, the adapter ID's of the adapters mounted on the slots are registered in connection with the address allocation data. No adapter ID is assigned to the slot having no adapter mounted and a code e.g. 'FFH' is registered instead which represents 'no adapter mounted'.

The above-described procedures for reading and registering the adapter ID's may be done at any time if needed but typically are carried out in establishing or modifying the system.

According to this embodiment, two or more adapters of the same type are allowed to be mounted on the slots. The size of the address space to be allocated to the adapters is constant regardless of the number of the types of adapters and therefore it is possible to avoid running short of the address space even in the case of increase in the number of the types of adapters used in the system. Also, the process of the processor is facilitated because of the slot-basis determination of the system configuration.

In the foregoing embodiment, while address allocator 6 is provided within the adapter it may be provided on the slot side, that is, each slot itself may produce the address data of FIG. 5. This can eliminate address allocators 6 from all the adapters.

In addition, while an address area for each slot is fixed in the foregoing embodiment, one slot may have a plurality of address areas allocated thereto depending on the functional group of the adapters wherein adapters are divided into a plurality of groups in function, for example for communication, an I/O interface, or an additional function. In this case, as shown in FIG. 7, adapter groups #1,#2 and #3 have different address allocators #1,#2 and #3 which allocate different address areas to their adapters even if mounted on an identical slot. Although this needs more address apace for adapters than that required for the case of FIG. 4, the necessary address space is still constant in size. This is useful in the case wherein the number of adapter ID bits is limited to a fixed number with possibility of running short of available adapter ID's. This arrangement requires that address allocators are provided within the adapters.

Again, the above-described embodiment may be combined with the prior art system which allocates a unique address area to an adapter itself. This permits a user to utilize the conventional adapters together with the adapters of this embodiment. To accomplish this, the conventional adapters are provided with address areas other than the address areas allocated to the slots. In determining the system configuration the conventional adapter, if accessed with its address by the processor, will return the slot ID or the potential levels of terminals a and b of the slot on which it is mounted. Thus, the processor is able to deal with both new and conventional types of adapters while distinguishing one from the other. Although this arrangement lessens the above-mentioned advantages of the present invention, still valid are advantages of mountability of the same type of adapters, reduction of the address space for allocation to adapters and facilitation of determination of the system configuration.

While the invention has been illustrated and described in the drawings and foregoing description, the same is to be considered as illustrative and not restrictive, it being understood that many changes and modifications are made without departing from the scope and spirit of the invention.

We claim:

1. An information processing system comprising:

an information processing apparatus having a plurality of slots; and a plurality of adapters mounted on respective slots of said information processing apparatus;

each slot of said information processing apparatus including means for generating a slot ID signal which is unique for that particular slot; and each of said plurality of adapters including means for receiving the slot ID signal from the slot on which the adapter is mounted, an address allocator for generating allocation address data for the adapter in response to the slot ID signal, the allocation address data being generated based on the slot ID signal and address information provided by said address allocator, the allocation address data identifying an address range allocated to the adapter when the adapter is mounted on the slot, the address range allocated to the adapter being an address range within an address space of said information processing apparatus, means for generating an adapter ID signal indicating the type of the adapter, and means for transmitting the adapter ID signal to the information processing apparatus in response to a request for the adapter ID signal from the information processing apparatus, the request including the allocation address data for the adapter;

wherein said plurality of adapters are divided into a plurality of groups;

wherein the address information provided by the address allocator of each adapter in each of the groups is unique to that group such that the address range allocated to the adapter is exclusive to that group; and wherein the adapter ID signal generated by the generating means of each adapter in each of the groups is unique to that group.

2. An information processing system comprising:

an information processing apparatus having a plurality of slots; and a plurality of adapters mounted on respective slots of said information processing apparatus;

each slot of said information processing apparatus including means for generating a slot ID signal which is unique for that particular slot; and each of said plurality of adapters including means for receiving the slot ID signal from the slot on which the adapter is mounted, an address allocator for generating allocation address data for the adapter in response to the slot ID signal, the allocation address data being generated based on the slot ID signal and address information provided by said address allocator, the allocation address data identifying an address range allocated to the adapter when the adapter is mounted on the slot, the address range allocated to the adapter being an address range within an address space of said information processing apparatus, means for generating an adapter ID signal indicating the type of the adapter, and means for transmitting the adapter ID signal to the information processing apparatus in response to a request for the adapter ID signal from the information processing apparatus, the request including the allocation address data for the adapter;

wherein the plurality of adapters include a plurality of types of adapters; and wherein the address information provided by the address allocator of each adapter of each of the types depends on the type of the adapter and is unique to that type such that the address range allocated to the adapter is exclusive to that type.

3. An adapter to be mounted on any one of a plurality of slots which are provided in an information processing apparatus, the adapter comprising:

means for receiving a slot ID signal from a slot on which the adapter is mounted;

an address allocator for generating allocation address data for the adapter in response to the slot ID signal, the allocation address data being generated based on the slot ID signal and address information provided by said address allocator, the allocation address data identifying an address range allocated to the adapter when the adapter is mounted on the slot, the address range allocated to the adapter being an address range within an address space of the information processing apparatus;

means for generating an adapter ID signal which indicates the type of the adapter; and means for transmitting the adapter ID signal to the information processing apparatus in response to a request for the adapter ID signal from the information processing apparatus, the request including the allocation address data for the adapter;

wherein the adapter is a specified type of adapter selected from a plurality of types of adapters; and wherein the address information provided by the address allocator depends on the type of the adapter and is the same as address information provided by address allocators in all other adapters of the specified type such that the address range allocated to the adapter is exclusive to the specified type.

4. An information processing system comprising:

an information processing apparatus having a plurality of slots; and a plurality of adapters mounted on respective ones of the slots of the information processing apparatus;

wherein each of the slots includes means for generating a slot ID signal which is unique for that particular slot; and wherein each of the adapters includes means for receiving the slot ID signal from the slot on which the adapter is mounted, an address allocator for generating allocation address data for the adapter in response to the slot ID signal, the allocation address data being generated based on the slot ID signal and address information provided by the address allocator, the address information representing a particular address range depending on the type of the adapter, the allocation address data identifying an address range allocated to the adapter when the adapter is mounted on the slot, the address range allocated to the adapter being an address range within an address space of the information processing apparatus, means for generating an adapter ID signal indicating the type of the adapter, means for transmitting the adapter ID signal to the information processing apparatus in response to a request for determining which type of adapter is mounted on the slot from the information processing apparatus, the request for determining which type of adapter is mounted on the slot including the allocation address data for the adapter, and means for performing an original function of the adapter in response to a request for the original function from the information processing apparatus, the request for the original function including the allocation address data for the adapter;

wherein the plurality of adapters include a plurality of types of adapters; and wherein the address information provided by the address allocator of each adapter of each of the types is unique to that type such that the address range allocated to the adapter is exclusive to that type.

5. An adapter to be mounted on any one of a plurality of slots which are provided in an information processing apparatus, the adapter comprising:

means for receiving a slot ID signal from a slot on which the adapter is mounted, an address allocator for generating allocation address data for the adapter in response to the slot ID signal, the allocation address data being generated based on the slot ID signal and address information provided by the address allocator, the address information representing a particular address range depending on the type of the adapter, the allocation address data identifying an address range allocated to the adapter when the adapter is mounted on the slot, the address range allocated to the adapter being an address range within an address space of the information processing apparatus, means for generating an adapter ID signal indicating the type of the adapter, means for transmitting the adapter ID signal to the information processing apparatus in response to a request for determining which type of adapter is mounted on the slot from the information processing apparatus, the request for determining which type of adapter is mounted on the slot including the allocation address data for the adapter, and means for performing an original function of the adapter in response to a request for the original function from the information processing apparatus, the request for the original function including the allocation address data for the adapter;

wherein the adapter is a specified type of adapter selected from a plurality of types of adapters; and wherein the address information provided by the address allocator is the same as address information provided by address allocators in all other adapters of the specified type such that the address range allocated to the adapter is exclusive to the specified type.

* * * * *